Nov. 11, 1958     H. J. STOLBACH     2,859,785
FOOD SLICER HAVING SAFETY SWITCH
Filed March 18, 1954     2 Sheets-Sheet 1
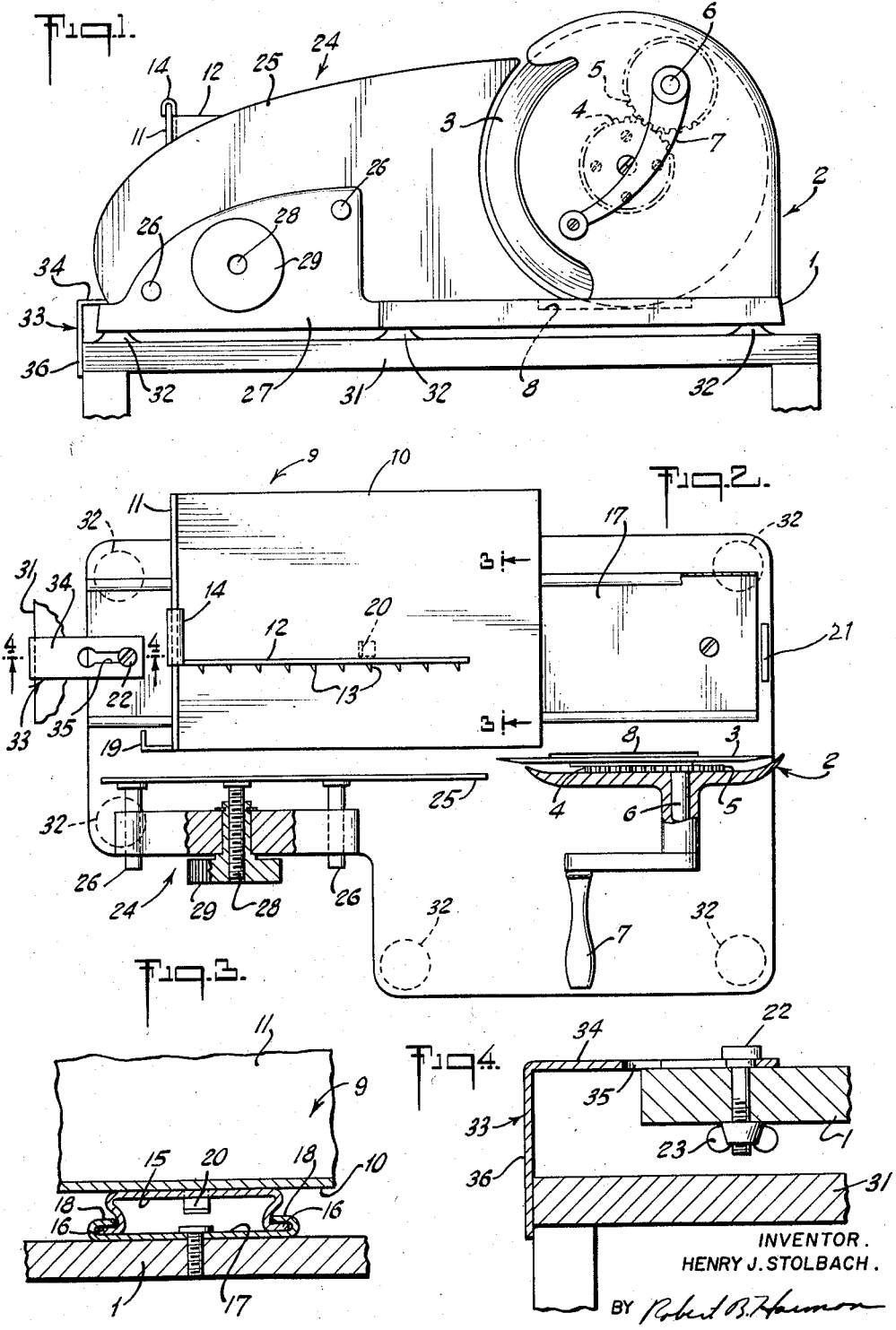
INVENTOR.
HENRY J. STOLBACH.
BY *Robert B. Harmon*
ATTORNEY.

Nov. 11, 1958  H. J. STOLBACH  2,859,785
FOOD SLICER HAVING SAFETY SWITCH
Filed March 18, 1954  2 Sheets-Sheet 2
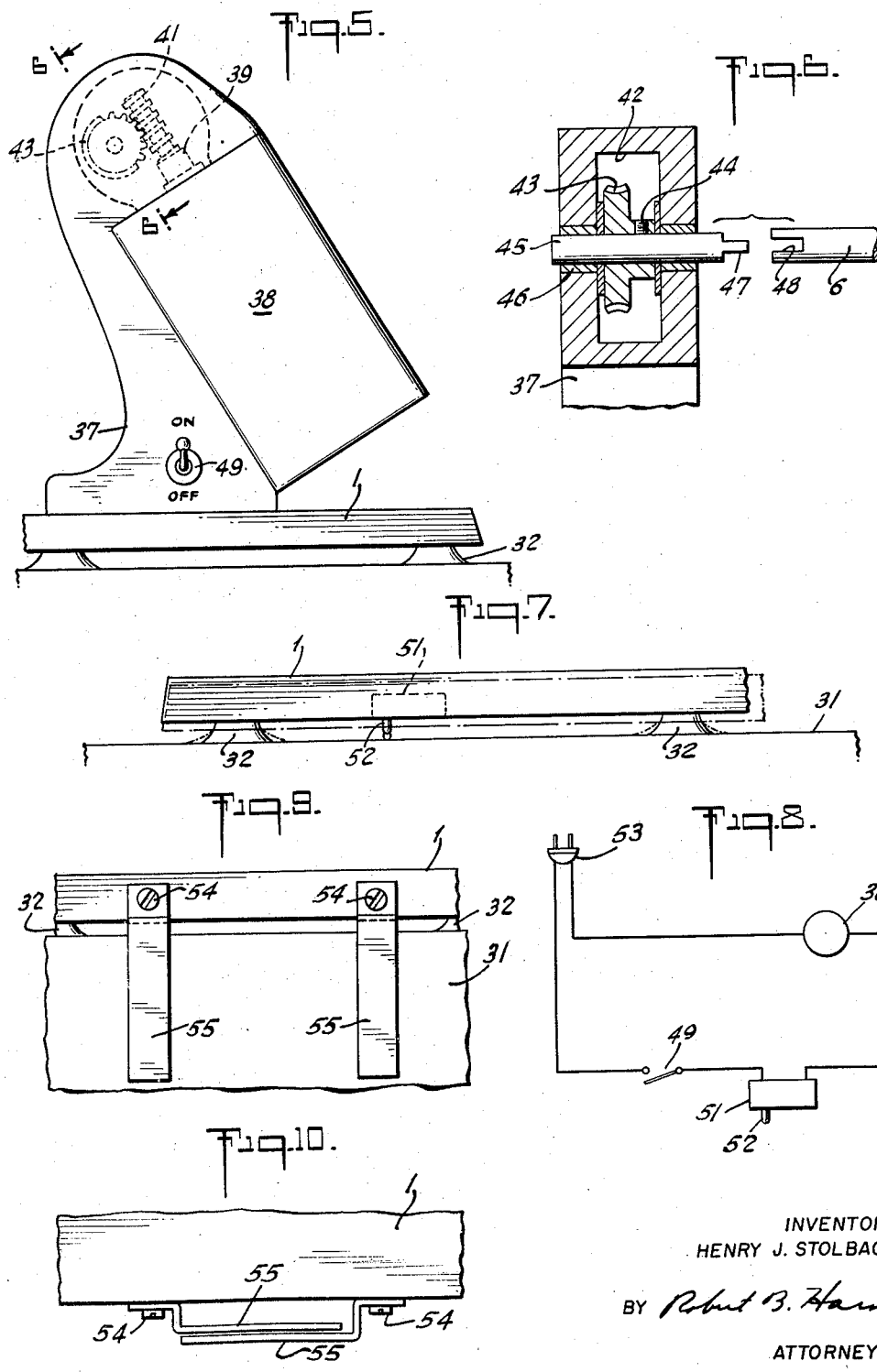
INVENTOR.
HENRY J. STOLBACH.
BY *Robert B. Harmon*
ATTORNEY.

United States Patent Office 2,859,785
Patented Nov. 11, 1958

2,859,785
FOOD SLICER HAVING SAFETY SWITCH

Henry J. Stolbach, White Plains, N. Y., assignor to National Food Slicing Machine Co., Inc., White Plains, N. Y.

Application March 18, 1954, Serial No. 417,067

6 Claims. (Cl. 146—102)

This invention relates to a food slicer and relates more particularly to a food slicer especially adapted for home use.

A food slicer especially adapted for home use, to be satisfactory, should meet a large number of exacting requirements. It should be easily cleaned without the use of tools so that no particles of food will remain on the slicer or accumulate under the slicer. It should also be readily portable so that it can be easily moved from one location to another, yet in use it should remain in position without slipping. If it is provided with an electric drive, safety means should be included therein to prevent its inadvertent operation.

It is an important object of this invention to provide a food slicer especially adapted for home use which will fulfill the foregoing requirements and which will be especially simple and efficient in construction and operation.

Other objects of this invention will be apparent from the following detailed description and claims.

According to the present invention, there is provided a food slicer comprising a base having an extended surface area formed of sheet metal, a die casting or the like. Fixed to the base is a cutting head including a circular cutting blade which may be caused to rotate by means of a handle or an electric motor drive. Also fixed to the base, as by screws, welding or the like, is a track comprising a channel member in which is mounted for slidable movement back and forth past the cutting head a food carrier. There is also fastened to the base an adjustable spacer to regulate the thickness of the slices of food. There are no openings in the base below the food carrier so that there is no possibility of food particles falling through said openings and accumulating under the slicer. Stops may be provided to limit the movement of the food carrier in the track and at least one of said stops may be made readily removable without the use of tools to permit the food carrier to be slid out of the track for cleaning.

To hold the food slicer in place during use, there are secured to the underside of the base a plurality of suction cups. While these suction cups can hold the food slicer without slipping on a smooth, impervious supporting surface, there is some danger of slipping when the slicer is placed on a rough or porous surface. To avoid such slippage, there is provided a bracket that projects downwardly from the forward edge of said base and is adapted to engage the edge of the supporting surface on which the food slicer is positioned. This bracket takes up the stress applied to the food slicer during the movement of the food carrier through the cutting stroke, which stroke is, of course, the one in which the maximum stress is applied to the food slicer and prevents the slippage of the food slicer during said stroke. The bracket is so designed that it can be moved to a position wherein it does not extend below the base so that the food slicer may be placed anywhere on a supporting surface without the bracket interfering with such placement. To this end, the bracket may be designed so that it is readily detachable from the base or so that it may be swung out of the way.

If desired, an electric drive means may be provided to operate the cutting blade. Advantageously, such drive means includes as a unitary structure a housing, a motor and the necessary gearing to reduce the drive speed to the proper value, together with a suitable coupling means for linking the output of the gearing to the cutter blade drive. Such unitary structure may be preassembled with all its elements accurately aligned and positioned and may then be readily connected in one simple operation to the cutting blade. As a safety feature, when an electric drive means is employed to operate the cutting blade, normally open safety switch means are provided in series with the electric drive means, and said normally open switch means is adapted to be closed by the application of pressure to the food carrier. For example, the normally open switch means may be mounted on the undersurface of the base with its operating button projecting downwardly, but clear of the supporting surface on which the food slicer is positioned. When pressure is applied to the food slicer during the slicing of food, the pressure will deform the resilient suction cups on which the base of the food slicer sits, moving the said base closer to the supporting surface and thereby bringing the operating button into contact with the supporting surface to close the switch means. In this way, the electric drive means will operate only when pressure is applied to the food slicer during the slicing of food. Of course, there are also provided conventional switch means, such as a toggle switch connected in series with the safety switch means to enable the power to the electric drive means to be turned on and off.

A preferred embodiment of this invention is shown in the accompanying drawings wherein Fig. 1 is a side elevation of the food slicer, Fig. 2 is a plan view of the food slicer shown with parts broken away, Fig. 3 is an enlarged cross-sectional view taken on the line 3—3 in Fig. 2 in the direction of the arrows, Fig. 4 is an enlarged cross-sectional view taken on the line 4—4 in Fig. 2 in the direction of the arrows, Fig. 5 is a side elevation of a modified form of the invention in which an electric motor drive is employed, Fig. 6 is an enlarged cross-sectional view taken on the line 6—6 in Fig. 5 in the direction of the arrows, Fig. 7 is a detail elevation showing the positioning of the safety switch, Fig. 8 is a circuit diagram of the motor circuit, Fig. 9 is a front elevation of a modified form of bracket, and Fig. 10 is a plan view of the bracket illustrated in Fig. 9 the latter being shown in horizontal position.

Referring now to the drawings, the reference numeral 1 designates a base to the rear of which is secured a cutting head, indicated generally by reference numeral 2. The cutting head 2 comprises a circular blade 3 to which is riveted a gear 4 which meshes with a gear 5 pressed onto a shaft 6. In the embodiment shown in Figs. 1 and 2 of the drawings, a handle 7 is screwed onto the end of the shaft 6 for driving the circular blade 3. The base 1 has a slot 8 extending therethrough which provides clearance for the lower edge of the circular blade 3.

The food to be sliced is supported on a platform, indicated generally by the reference numeral 9. The food platform 9 comprises a bed 10 from the forward end of which there extends upwardly a plate 11 against which the food may be placed. The food is held securely on the platform 9 by means of a gripper 12, that extends at right angles to the plate 10 and is provided with a plurality of teeth 13 that engage the food. At its forward end, the gripper 12 has integral therewith a downwardly opening generally U-shaped member 14 that is hooked slideably over the upper edge of the plate 11.

The food platform 9 has secured to the lower surface thereof a channel member 15 having a pair of outwardly projecting lips 16 which are slideably engaged in a track comprising a channel member 17 having a pair of inwardly projecting lips 18. The channel member 17 extends the full length of the base 1, to which it is secured, whereby the food platform 9 may be slideably moved along said channel member to carry the food past the circular blade 3 of the cutting member 2 and thereby slice the food. As a safety measure to avoid accidental contact of the hand with the circular blade 3, there is secured to the front surface of the plate 11 a handgrip comprising a U-shaped member 19. To keep the food platform 9 from leaving the channel member 17, a prong 20 is struck downwardly from the channel member 15 and is adapted, when the food platform 9 is moved to the rear of the base 1, to engage a boss 21 projecting upwardly from the said base. To limit the forward movement of the food platform 9 there is provided a stop which the prong 20 will engage, comprising a shoulder headed screw 22 that extends through the base 1 and is held in place with a wing nut 23. When it is desired to remove the food platform 9 for cleaning the same or for cleaning the base 1, it is simply necessary to unscrew the wing nut 23, remove the screw 22 and slide the food platform 9 out of the front edge of the channel member 17.

A spacer, indicated generally by reference numeral 24, is provided for regulating the thickness of the slices of food. The spacer 24 comprises a plate 25 against which the food abuts and which is supported by means of a pair of guides 26 that are slideably journalled in an upright 27 projecting from the side edge of the base 1. Also secured to the plate 25 is a screw 28 which is in threaded engagement with a knurled nut 29 rotatably journalled in the upright 27. Rotation of the nut 29 will cause the plate 25 to move relative to the circular blade 3 whereby a food slice of any desired thickness may be readily obtained.

The food slicer is held in place on a supporting surface, such as a table 31, by means of five suction cups 32 secured to the undersurface of the base 1. While the suction cups 32 are adequate to hold the food slicer without danger of slipping on smooth impervious surfaces, such as glass, porcelain and the like, and during the cutting of most food stuffs, there is a possibility that the food slicer will slip when it is supported on a rough or porous surface, such as wood or the like, or during the cutting of certain foodstuffs. To prevent such undesired slippage of the food slicer there is provided a right-angled bracket 33, one leg 34 of which has a keyhole slot 35 therein which can be easily hooked over the shoulder-headed screw 22 and the other leg 36 of which will project downwardly from the forward edge of the base 1 and will abut the edge of the table 31. In this way, all possibility of slippage of the food slicer is substantially eliminated.

Figs. 5 to 8 of the drawings show a modified form of the invention in which an electric motor drive is provided for rotating the circular blade 3. Referring now to these figures, there is mounted on the base 1, a housing 37 to which is secured an electric motor 38 whose drive shaft 39 extends upwardly at an acute angle to the vertical and which has secured thereto a worm 41. The housing 37 is provided adjacent its upper end with a cavity 42 in which is positioned a worm gear 43 that meshes with the worm 41. The worm gear 43 is secured, by means of a set screw 44, to a shaft 45 which is rotatably journalled in bushings 46 in the walls of the housing 37. The end of the shaft 45 is shaped to form a key 47 adapted to engage a slot 48 in the end of the drive shaft 6 and thereby drive the circular blade 3.

The unitary construction of the housing 37, the motor 38 and the reduction gearing associated therewith permits the separate and accurate assembly of the said elements and their subsequent incorporation into the food slicer without any danger of misalignment. A switch 49 mounted in the housing 37 enables the motor 38 to be turned "on" and "off" as desired.

As a safety feature to prevent inadvertent operation of the motor 38, a switch 51 having a downwardly projecting operating button 52 is mounted beneath the base 1 in such a manner that the operating button 52 will be clear of the table 31 when no pressure is applied to the food slicer. When, however, food is being sliced and pressure is applied to the food slicer, the resilient suction cups 32 will be deformed, as shown in dotted lines in Fig. 7 of the drawings, reducing the distance between the base 1 and the top of the table 31 and bringing the operating button 52 into contact with the top of said table. The switch 51 is normally open and is connected in series with the switch 49 in the circuit from a power supply 53 to the motor 38. As a result, the motor 38 will not operate when the switch 49 is moved to the on position until pressure is applied to the food slicer to close the switch 51.

A modified form of bracket to keep the food slicer from slipping is shown in Figs. 9 and 10 of the drawings. According to the embodiment of the invention shown in these figures, there is secured to the forward edge of the base 1, by means of shoulder headed screws 54, a pair of brackets 55 which extend downwardly and engage the edge of the table 31 as shown in Fig. 9. The brackets 55 are adapted to be swung around parallel to the base 1 so that they will not project below said base whereby the food slicer may be positioned anywhere on a supporting surface. To this end, one of the brackets 55 is designed so that it will be spaced from the base 1 a somewhat greater distance than the other of the said brackets so that the brackets 55 will overlap one another, as shown in Fig. 10 of the drawings, when they are moved to this position.

It is to be understood that the foregoing description is illustrative only and that many variations may be made therein in putting my invention into practice.

Having described my invention, what I claim is:

1. A food slicer comprising a base, a cutting head including a driven blade secured to said base, a food carrier secured to said base for slideable movement to carry food mounted on said carrier past said cutting head, electric drive means for operating said blade, deformable resilient means supporting said food slicer, and normally open safety switch means positioned to be closed by the movement of the food slicer on deformation of the resilient supporting means through the application of pressure to the food carriage for preventing operation of said electric drive means until pressure is applied to the food carrier.

2. A food slicer comprising a base, a cutting head including a driven blade secured to said base, a food carrier secured to said base for slideable movement to carry food mounted on said carrier past said cutting head, and electric drive means for operating said blade, said electric drive means including as a unitary assembly a housing having a cavity therein, a motor secured to said housing and having a shaft extending into said cavity, a worm connected to said motor shaft, a shaft having a coupling member adapted to operatively engage said driven blade mounted in the walls of said housing, and a worm gear fastened to said second shaft and meshed with said worm for operatively connecting said motor to said driven blade.

3. A food slicer comprising a base, a cutting head including a driven blade secured to said base, a food carrier secured to said base for slideable movement to carry food mounted on said carrier past said cutting head, electric drive means for operating said blade, a plurality of deformable resilient suction cups secured to the underside of said base for holding the food slicer in place on a supporting surface, and normally open safety switch means positioned to be closed by the movement of the food slicer on deformation of the suction cups through the application of pressure to the food carrier for preventing operation of said electric drive means until pressure is applied to the food carrier.

4. A food slicer comprising a base, a cutting head secured to said base, a track secured to the upper surface of said base, a food carrier mounted for slideable movement in said track to carry food mounted on said carrier back and forth past said cutting head, stops for limiting the slideable movement of said food carrier in the track, one of said stops comprising a shoulder headed screw extending through the base and projecting above the upper surface of the base, and a right-angled bracket having a key-hole slot in one leg hooked over said screw and having its other leg projecting downwardly from said base for engaging an edge of a supporting surface on which the food slicer in positioned to prevent slippage of said food slicer.

5. A food slicer comprising a base, a cutting head secured to said base, a food carrier secured to said base for slideable movement to carry food mounted on said carrier back and forth past said cutting head, and a shoulder headed screw extending through the base and projecting above the upper surface of the base, and a right-angled bracket having a key-hole slot in one leg hooked over said screw and having its other leg projecting downwardly from said base for engaging an edge of a supporting surface on which the food slicer is positioned to prevent slippage of said food slicer.

6. A food slicer comprising a base having an extended surface area, a cutting head including a driven blade secured to the rear of said base, a track comprising a channel having a pair of inwardly projecting lips secured to the upper surface of said base, a food carrier having secured to its lower surface a channel member having a pair of outwardly projecting lips mounted for slideable movement in said track to carry food mounted on said carrier back and forth past said cutting head, the outwardly projecting lips of said second channel member being positioned between the inwardly projecting lips of said track, a prong struck downwardly from said food carrier, stops adapted to be engaged by said prong for limiting the slideable movement of the food carrier in the track, the most forward of said stops comprising a shoulder headed screw extending through the base and projecting above the upper surface of the base, a right-angled bracket having a key-hole slot in one leg hooked over said screw and having its other leg projecting downwardly from the forward edge of said base for engaging an edge of a supporting surface on which the food slicer is positioned to prevent slippage of said food slicer, electric drive means for operating said blade, said electric drive means including as a unitary assembly a housing having a cavity therein, a motor secured to said housing and having a shaft extending into said cavity, a worm connected to said motor shaft, a shaft having a coupling member adapted to operatively engage said driven blade mounted in the walls of said housing, and a worm gear fastened to said second shaft and meshed with said worm for operatively connecting said motor to said drive shaft, a plurality of deformable resilient suction cups secured to the underside of said base for holding the food slicer in place on a supporting surface, and normally open safety switch means positioned to be closed by the movement of the food slicer on deformation of the suction cups through the application of pressure to the food carrier for preventing operation of said electric drive means until pressure is applied to the food carrier.

References Cited in the file of this patent

UNITED STATES PATENTS

| Number | Name | Date |
|---|---|---|
| 938,649 | Diehl | Nov. 2, 1909 |
| 1,273,138 | Bond | July 23, 1918 |
| 1,284,684 | Hopkinson et al. | Nov. 12, 1918 |
| 1,391,320 | Hood et al. | Sept. 20, 1921 |
| 1,566,064 | Basse | Dec. 15, 1925 |
| 1,724,598 | Johnston | Aug. 13, 1929 |
| 1,951,826 | Foster | Mar. 20, 1934 |
| 2,484,281 | Gardner | Oct. 11, 1949 |
| 2,611,406 | Preble | Sept. 23, 1952 |
| 2,749,954 | Green et al. | June 12, 1956 |